United States Patent
Lovsen et al.

(10) Patent No.: US 9,602,417 B2
(45) Date of Patent: Mar. 21, 2017

(54) MULTIPLE BEARER SUPPORT UPON CONGESTION SITUATIONS

(75) Inventors: Lars Lovsen, Gothenburg (SE); Susana Fernandez Alonso, Madrid (ES); Maria Belen Pancorbo Marcos, Madrid (ES)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 1083 days.

(21) Appl. No.: 13/348,780

(22) Filed: Jan. 12, 2012

(65) Prior Publication Data

US 2012/0182868 A1    Jul. 19, 2012

Related U.S. Application Data

(60) Provisional application No. 61/432,223, filed on Jan. 13, 2011.

(51) Int. Cl.
*H04L 12/823* (2013.01)
*H04M 15/00* (2006.01)
(Continued)

(52) U.S. Cl.
CPC .......... *H04L 47/263* (2013.01); *H04M 15/64* (2013.01); *H04M 15/66* (2013.01);
(Continued)

(58) Field of Classification Search
CPC .. H04L 47/263; H04L 47/32; H04W 28/0257; H04W 28/0268; H04M 15/64; H04M 15/66; H04M 15/8027
(Continued)

(56) References Cited

U.S. PATENT DOCUMENTS

| 2004/0052212 A1* | 3/2004 | Baillargeon .......... H04L 1/0002 370/235 |
| 2011/0080870 A1* | 4/2011 | Bhalla et al. ................. 370/328 |

(Continued)

FOREIGN PATENT DOCUMENTS

| WO | 2007121264 A2 | 10/2007 |
| WO | 2011124106 A1 | 10/2011 |

OTHER PUBLICATIONS

ZTE, "Reporting the eNodeB Capability of Supporting ECN", 3GPP TSG SA WG2 Meeting #82, S2-105421, Nov. 15-19, 2010, 23.402 CR, 0942, Ver. 10.1.0, 12 pages, XP050522819A.
(Continued)

*Primary Examiner* — Ayaz Sheikh
*Assistant Examiner* — Debebe Asefa
(74) *Attorney, Agent, or Firm* — Rothwell, Figg, Ernst & Manbeck, P.C.

(57) ABSTRACT

The embodiments herein relates to a method for enabling multiple bearer support upon congestion situations in a communication network. The PCC architecture is enabled to determine whether separate bearers need to be established for service(s) that demand MBR>GBR when no ECN support is provided. This is provided in nodes and methods receiving, using a receiving unit (301), an indication of session establishment for a bearer from a bearer binding function unit (113, 115), obtaining profile information with Quality of Service, QoS, information about maximum bit rate, MBR, and guaranteed bit rate, GBR, related to the bearer; determining that the MBR is larger than the GBR, making a policy decision, and transmitting, using the transmitting unit (305), an acknowledgement of session establishment to the bearer binding function unit with an indicator that a separate bearer is to be established.

11 Claims, 3 Drawing Sheets

(51) Int. Cl.
*H04L 12/825* (2013.01)
*H04W 28/02* (2009.01)

(52) U.S. Cl.
CPC ... *H04M 15/8027* (2013.01); *H04W 28/0257* (2013.01); *H04W 28/0268* (2013.01); *H04L 47/32* (2013.01)

(58) Field of Classification Search
USPC .......................... 370/254–350; 709/201–213
See application file for complete search history.

(56) References Cited

U.S. PATENT DOCUMENTS

2011/0320620 A1* 12/2011 Cutler et al. .................. 709/229
2012/0002540 A1* 1/2012 Siddam ................. H04W 28/24
370/230

OTHER PUBLICATIONS

Huawei, "Supporting MBR larger than GBR for bearer binding", 3GPP TSG-CT WG3 Meeting #60, C3-101141, Nov. 15-19, 2010, 29.213 CR, 287, Ver. 9.4.1, 2 pages.
International Search Report from PCT/EP2012/050276, mail date May 8, 2012, 4 pages.

* cited by examiner

MULTIPLE BEARER SUPPORT UPON CONGESTION SITUATIONS

This application claims the benefit of U.S. Provisional Patent Application No. 61/432,223, filed on Jan. 13, 2011, the entire contents of which is incorporated by reference herein.

TECHNICAL FIELD

The present invention relates generally to multiple bearer support upon congestion situations in a telecommunications network.

BACKGROUND

The 3rd Generation Partnership Project (3GPP) is a collaboration between groups of telecommunications associations, aiming to make a globally applicable third-generation (3G) mobile phone system specification. The 3GPP standardization encompasses Radio, Core Network and Service architecture. Examples of 3PP systems are Global System for Mobile Communications (GSM), Universal Mobile Telecommunications System (UMTS), and Long Term Evolution (LTE).

The 3GPP system is currently being evolved into a system that is composed of heterogeneous access systems with the aim to provide various services at a higher-data-rate and lower-latency. Efficient resource usage, charging and international roaming, inherent features within the 3GPP system, are among the key capabilities to be retained in the evolved system. A policy control and charging (PCC) architecture allows operators and service providers to perform service based Quality of Service (QoS) policy and flow based charging control in communication networks. The level of service is related to the charged rates.

In telecommunication systems or networks signals are sent between network nodes. Bearers are used for transmitting the signals between the network nodes.

A Policy Control and Charging Rules Function (PCRF) is a functional element in communication networks that encompasses policy control decision and flow based charging control functionalities. The PCRF provides network control regarding the service data flow detection, gating, QoS and flow based charging, except credit management, towards a Policy and Charging Enforcement Function (PCEF). The PCRF receives session and media related information from an Application Function (AF) and informs the AF of traffic plane events.

The PCRF shall provision PCC Rules to the PCEF via a Gx reference point. A PCC Rule is a set of information enabling the detection of a service data flow and providing parameters for policy control and/or charging control The PCRF shall inform the PCEF through the use of PCC rules on the treatment of each service data flow that is under PCC control, in accordance with the PCRF policy decision(s). The PCC rule comprises information for detecting the service data flow, for instance charging information and QoS information, e.g. Maximum Bit Rate (MBR), Guaranteed Bit Rate (GBR), QoS Class Identifier (QCI), Allocation, Retention and Priority (ARP).

Maximum Bitrate (MBR) defines the maximum number of bits delivered within a period of time, divided by the duration of the period. The Maximum bitrate is the upper limit a user or application may accept or provide. All bearer service attributes may be fulfilled for traffic up to the Maximum bitrate depending on the network conditions.

Guaranteed Bitrate (GBR) defines the guaranteed number of bits delivered within a period of time, provided that there is data to deliver, divided by the duration of the period. Bearer service attributes, e.g. delay and reliability attributes, are guaranteed for traffic up to the Guaranteed bitrate. For the traffic exceeding the Guaranteed bitrate the bearer service attributes are not guaranteed.

The AF is an element offering applications in which service is delivered in a different layer, i.e. transport layer, from the one the service has been requested, i.e. signaling layer, the control of Internet Protocol (IP) bearer resources according to what has been negotiated. One example of an AF is a Proxy Call Session Control Function (P-CSCF) of an IP Multimedia Core Network (IM CN) subsystem. The AF shall communicate with the PCRF to transfer dynamic session information, i.e. description of media to be delivered in the transport layer. This communication is performed using an Rx interface.

The PCEF encompasses service data flow detection, based on filters definitions included in the PCC rules, as well as online and offline charging interactions (not described here) and policy enforcement. Since the PCEF is the entity handling the bearers, it is where the QoS is being enforced for the bearer according to the QoS information coming from the PCRF. This functional entity is located at a Gateway, e.g. Gateway General packet radio service Support Node (GGSN) in the General Packet Radio Service (GPRS) case, Packet Data Network Gateway (PDN GW) in an LTE case, and Packet Data Gateway (PDG) in the Wireless Local Area Network (WLAN) case. For the cases where there is Proxy Mobile IP (PMIP) instead of GPRS Tunneling Protocol (GTP) protocol used between a Bearer Binding and Event Reporting Function (BBERF) and the PCEF, the bearer control is done in the BBERF instead, in this case QoS rules are provided to the BBERF.

Bearer binding as used in 3GPP is an association of the PCC rule and when applicable its QoS rule, if applicable, to an Internet Protocol Connectivity Access Network (IP-CAN) bearer within an IP-CAN session. For 3GPP Evolved Packet System (EPS) accesses, this function is located either at the BBERF or at the PCEF, depending on the deployment architecture. An IP-CAN bearer is an IP transmission path of defined capacity, delay and bit error rate, etc. An IP-CAN session is an association between a user equipment (UE) and an IP network. The association is identified by a UE IP address together with a user equipment identity information, if available. An IP-CAN session incorporates one or more IP-CAN bearers. An IP-CAN session exists as long as the UE IP address is established and announced to the IP network.

The BBERF/PCEF evaluate whether it is possible to use one of the existing IP-CAN bearers or not and whether to initiate IP-CAN bearer modification if applicable. If none of the existing bearers are possible to use, the BBERF/PCEF initiate the establishment of a suitable IP-CAN bearer. The binding is created between service data flow(s) and the IP-CAN bearer which have the same QCI and ARP, i.e. which have the same QoS categorization and priority demands.

In principle, it is assumed that all PCC rules with the same QCI and ARP are bound to the same bearer. From the standards point of view, it is not precluded to establish more than one bearer with the same QCI and ARP, although it is not specified under which conditions this could occur.

The MBR of the bearer is calculated as the sum of all the MBRs of the PCC rules bound to that bearer. In the same way, the GBR of the bearer is calculated as the sum of all the GBRs of the PCC rules bound to that bearer.

Until Release 10 of 3GPP standardization for communication networks, 3GPP networks with EUTRAN access have the limitation that the MBR of a particular bearer shall be set equal to the GBR. This limitation has been removed from Release 10 onwards. In principle, having MBR=GBR ensures that there will be no bandwidth limitation in the support of the services bound to a specific bearer. Since the network has reserved resources considering that the maximum bit rate that may be required for all services, the user experience will not be downgraded.

The decision to set MBR and GBR for the PCC rule is located in the PCRF and is based on operator policies, AF identifier and Session Description Protocol (SDP) negotiated information, for IP Multimedia Subsystem (IMS) services. SDP is a format for describing multimedia communication sessions, such as streaming media initialization parameters or multicast session setup. IMS is an architectural framework for delivering IP multimedia services.

Explicit Congestion Notification (ECN) is an extension to LP and Transmission Control Protocol (TCP) protocols that allow end-to-end notification of network congestion without dropping packets. In order to support this feature, it is needed that both end points support it.

Traditionally, TCP/IP networks signal congestion by dropping packets. When ECN is successfully negotiated, an ECN-aware node may set a mark in the IP header instead of dropping a packet in order to signal impending congestion.

At the receiving end point this congestion indication is handled by an upper layer protocol and needs to be echoed back to the transmitting node in order to reduce its required transmission rate, for instance by changing media encoding.

3GPP has agreed on a mechanism to notify the data source that there is a risk for congestion in the network using Explicit Congestion Notification.

Using ECN, when Real-Time Transport Control Protocol (RTCP) is used, comprises feedback of ECN congestion experienced markings to the sender using RTCP, verification of ECN functionality end-to-end and how to initiate ECN usage. The initiation process impacts the signaling mechanism using SDP. Having ECN as part of IMS solutions, allows minimizing the impact of congestion on real-time multimedia traffic.

When ECN is supported, the Evolved Universal Terrestrial Radio Access Network (EUTRAN) should attempt not to drop any packets on a bearer during a defined grace period. It is considered that in this case the MBR of the bearer may be greater than the GBR. Since the PCRF is the node that sets both the MBR and GBR, it is assumed that it has the knowledge about the network support of this feature. The PCRF sets MBR>GBR as appropriate for flows as defined for IMS.

The handling of a rule with MBR>GBR is up to operator policy, e.g. an independent IP-CAN bearer may be maintained for that SDF to prevent unfairness between competing SDFs.

As described in previous clauses, the PCRF may decide to set the MBR greater than the GBR for the applicable service data flows in certain cases, comprising when ECN is supported.

It is also indicated that it may be assumed that the normal case will be that only one bearer is established for all service data flows with the same QCI and ARP. In principle there is no need to establish a second bearer when the MBR=GBR for all flows bound to that bearer, since the resources, i.e. GBR, are reserved considering the maximum bandwidth allowed for each flow, i.e. MBR. Each flow is also policed for its MBR which ensures that the flow does not interfere with the GBR granted for other flows. It should be noted that ECN is signaled to all sources, i.e. all service flows on the same bearer may be affected.

When ECN is supported and flows where MBR>GBR are provided, if only one bearer with the same QCI/ARP is established, the codec rate, encoding, of certain services will be reduced when a congestion situation is detected. The user perception will then be affected for those services that are marked with the ECN congestion indicator.

If the PCRF establish the MBR>GBR based on other operator policies, without the ECN support, the packets for certain services may be dropped, and then the user perception will be worse.

This congestion situation could be solved by always establishing a separate bearer whenever a service requires MBR>GBR. However, there is a limitation to the number of bearers in the UE access to the public land mobile network (PLMN). Mandating a separate bearer for each flow with MBR>GBR increases the signaling and may cause the number of possible bearers being exhausted.

In 3GPP and in bilateral discussions it is declared that the legacy principle with one bearer per QCI/ARP combination suffice when either (a) all the PCC rules have MBR equal to the GBR, or (b) there is full support for ECN for all the PCC rules where MBR is greater than GBR.

The 3GPP standard however does not prevent, and should not prevent, that a PCC rule, based on operator policy, gets an MBR greater than GBR without the support for ECN being present. For such use, there is a risk for unfairness between flows when allocated to the same bearer. In order to avoid possible unfairness, each such flow could get a separate bearer. For the case of full support for ECN, it would however generate unnecessarily many bearers.

SUMMARY

An objective of embodiments herein is therefore to obviate at least one of the above disadvantages and to provide multiple bearer support upon congestion situations.

The embodiments herein enables the PCC architecture so that it may determine whether separate bearers need to be established for service(s) that demand MBR>GBR.

The PCRF instructs the PCEF to bind PCC/QoS Rules into separate bearers when MBR is greater than GBR, by comprising an indicator over the Gx/Gxx reference point. Typically the PCRF takes the decision depending on the network capability to support ECN, and the user subscription.

This is provided in a number of aspects of the present invention in which a first is an infrastructure node for handling bearer establishment in a telecommunications network—The node may comprise a processing unit, a storage unit, a receiving unit, and a transmitting unit. The processing unit may be arranged to execute instructions sets stored in the storage unit. The instruction sets may be arranged to receive, using the receiving unit, an indication of session establishment for a bearer from a bearer binding function unit, obtain profile information with Quality of Service, QoS, information about maximum bit rate, MBR, and guaranteed bit rate, GBR, related to the bearer, determine that the MBR is larger than the GBR, make a policy decision; and transmit, using the transmitting unit, an acknowledgement of session establishment to the bearer binding function unit with an indicator that a separate bearer is to be established.

The indication for a separate bearer may also comprise an indication of maximum number of separate bearers which has the advantage of controlling the maximum allocation of bearers.

The bearer binding function unit may be one of a policy and charging enforcement function, PCEF, or a bearer binding and event reporting function, BBERF.

Another aspect of the present invention is provided, a method in an infrastructure node in a telecommunications network for handling bearer establishment. The method may comprise steps of receiving, using a receiving unit, an indication of session establishment for a bearer from a bearer binding function unit, obtaining profile information with Quality of Service, QoS, information about maximum bit rate, MBR, and guaranteed bit rate, GBR, related to the bearer, determining that the MBR is larger than the GBR, making a policy decision, and transmitting, using the transmitting unit, an acknowledgement of session establishment to the bearer binding function unit with an indicator that a separate bearer is to be established.

Yet another aspect of the present invention is provided, a bearer binding function unit in a telecommunications network. The unit may comprise a processing unit, a storage unit, a receiving unit, and a transmitting unit. The processing unit may be arranged to execute instructions sets stored in the storage unit to receive, using the receiving unit, an acknowledgement of session establishment from an infrastructure node for handling bearer establishment, determine from the acknowledgement of session establishment if a separate bearer is to be established for the session, and establish a separate bearer for the session.

Furthermore, still another aspect of the present invention is provided, a method in a bearer binding function unit. The method may comprise steps of receiving, using a receiving unit, an acknowledgement of session establishment from an infrastructure node for handling bearer establishment, determining from the acknowledgement of session establishment if a separate bearer is to be established for the session, and establishing a separate bearer for the session.

An example is an operator that wants gold subscribers to get separate bearers to get better user experience and bronze subscribers to get the same bearer when user experience is not that relevant.

A second example is an operator that wants to transfer voice over a separate bearer when MBR is greater than GBR to guarantee good quality for all type of subscribers.

For those deployments with an access node implementing a BBERF, the PCRF instructs the BBERF as well.

Depending on operator policies configured in the PCRF, it is possible to decide whether a separate bearer is required for a service data flow when the MBR is greater than the GBR. These operator policies will be based on information stored in the PCRF, e.g. kind of subscriber, and the final decision will be notified to the PCEF via the Gx reference point.

When the operator policies relate to all IP-CAN sessions and users, they may be configured locally in the PCEF. Any decision provided by the PCRF would overwrite the decision made locally.

Embodiments herein afford many advantages, for which a non-exhaustive list of examples follows:

An advantage is that the embodiments herein enable the operator to control the congestion situations based on different criteria, as kind of subscriber and type of network.

A further advantage is that the embodiments herein allow the user to have a good experience when he is a gold subscriber, regardless of possible congestion situations.

Another advantage is that the embodiments herein provide improved utilization of radio resource in the communication network.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail in the following detailed description by reference to the appended drawings illustrating embodiments herein and in which.

The drawings are not necessarily to scale and the dimensions of certain features may have been exaggerated for the sake of clarity, emphasize is instead being placed upon illustrating the principle of the embodiments herein.

DETAILED DESCRIPTION

Figure 1:
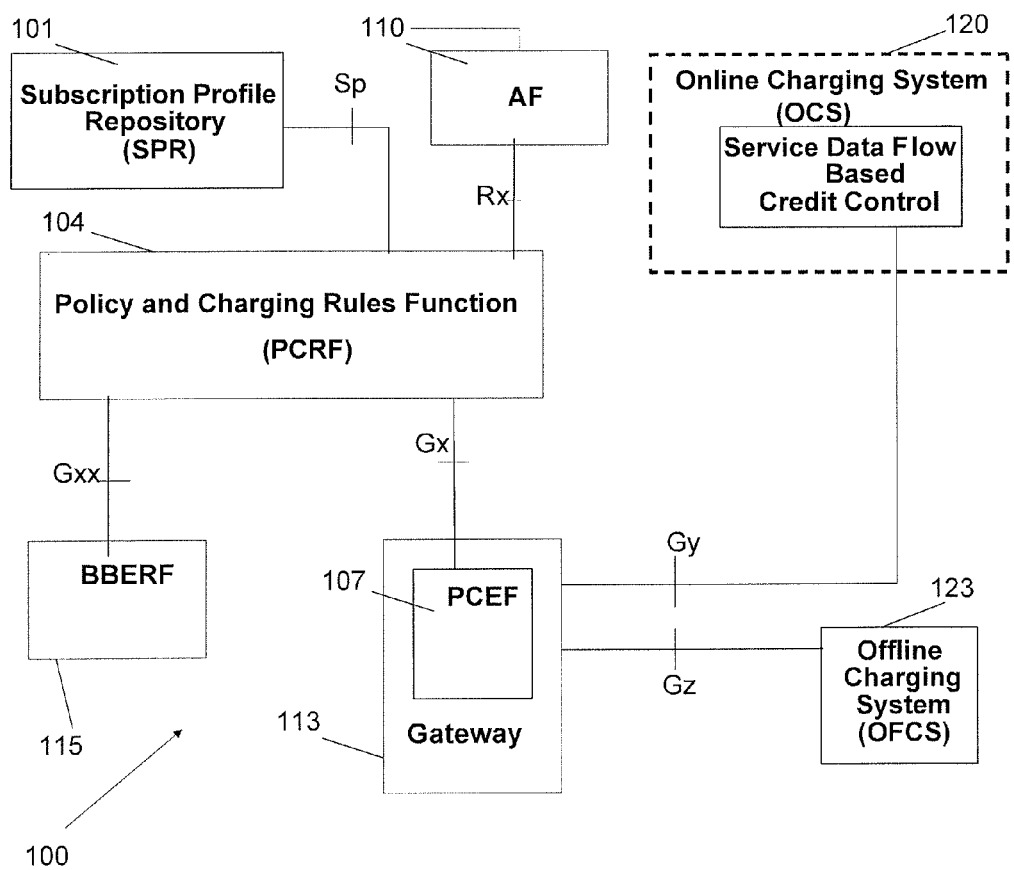
FIG. 1 is a block diagram illustrating embodiments of a communication network.

FIG. 1 is a block diagram illustrating embodiments of a communication network 100. In more detail, FIG. 1 illustrates a PCC architecture when Subscription Profile Repository (SPR) 101 is used. This FIG. 1 specifies the PCC functionality for Evolved 3GPP Packet Switched domain, comprising both 3GPP accesses, i.e. GSM EDGE Radio Access Network/Universal Terrestrial Radio Access Network (GERAN/UTRAN)/E-UTRAN, and Non-3GPP accesses.

The communication network 100 comprises a PCRF 104, which is a functional element that encompasses policy control decision and flow based charging control functionalities. The PCRF 104 provides network control regarding the service data flow detection, gating, QoS, and flow based charging, except credit management, towards a PCEF 107. The PCRF 104 is a network node which receives session and media related information from an AF 110 and informs the AF 110 of traffic plane events.

The PCRF 104 provision PCC Rules to the PCEF 107 via the Gx reference point.

The PCRF 104 informs the PCEF 107 through the use of PCC rules on the treatment of each service data flow that is under PCC control, in accordance with the PCRF 104 policy decision(s). The PCC rule comprises the service data flow, charging information and QoS information, e.g. MBR, GBR, QCI, and ARP.

The Application Function (AF) 110 is an element offering applications in which service is delivered in a different layer, i.e. transport layer, from the one the service has been requested, i.e. signaling layer, the control of IP bearer resources according to what has been negotiated. One example of an AF 110 is the P-CSCF of the IM CN subsystem. The AF 110 communicates with the PCRF 104 to transfer dynamic session information, i.e. description of the media to be delivered in the transport layer; this communication is performed using the Rx interface.

The PCEF 107 encompasses service data flow detection, based on the filters definitions comprised in the PCC rules, as well as online and offline charging interactions (not described here) and policy enforcement. Since the PCEF 107 is the one handling the bearers is where the QoS is being enforced for the bearer according to the QoS information coming from the PCRF 104. This functional entity is located at the Gateway (GW) 113, e.g. GGSN in the GPRS case, Packet Data Network Gateway (PDN GW) in an LTE case, and PDG in the WLAN case. For the cases where there is PMIP instead of GTP protocol between a BBERF 115 and PCEF 107, the bearer control is done in the BBERF 115 instead, in this case QoS rules are provided to the BBERF 115.

The communication network 100 further comprises an Online Charging System (OCS) 120, which provides service data flow based credit control, i.e. it allows communication service providers to charge their customers, in real time, based on service usage. The OCS 120 is associated with the PCEF 107. Further, an Offline Charging System (OFCS) 123 is also associated with the PCEF 107 and is responsible for the offline charging record.

Figure 2:
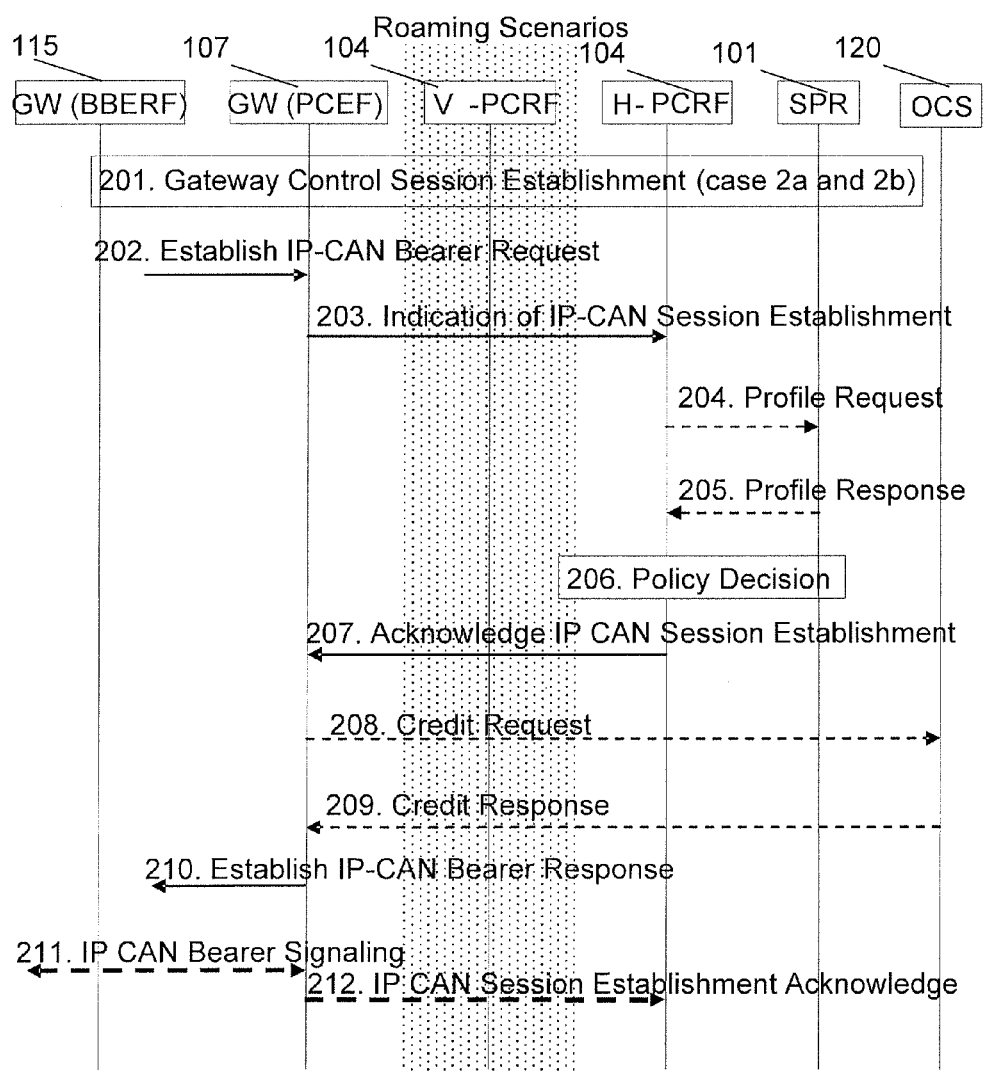
FIG. 2 is a flow chart illustrating embodiments of IP-CAN session establishment.

Internet Protocol Connectivity Access Network (IP-CAN) session establishment wherein the present invention is part of will now be discussed. In the 3GPP procedure for establishing an IP-CAN session, the PCRF 104 may provide an indicator to the GW 113 to establish a separate bearer for each flow, i.e. PCC rule, with MBR>GBR. FIG. 2 is a combined flow chart and signaling diagram illustrating embodiments of a method for an TP-CAN session establishment. The method comprises the following steps, which steps may as well be carried out in another suitable order than described below.

Step 201: A gateway control session is established in accordance with suitable processes.

Step 202: The PCEF 107 receives an establish IP-CAN bearer request from a gateway, e.g. a BBERF.

Step 203: The PCEF 107 transmits an indication of IP-CAN Session Establishment to the home-PCRF (H-PCRF) 104.

Step 204: The H-PCRF 104 transmits a Profile Request to the SPR 101, requesting profile information stored for the UE relating to the bearer establishment.

Step 205: The SPR 101 transmits a Profile Response to the H-PCRF 104.

Step 206: The H-PCRF 104 makes a Policy Decision based on received profile information.

Step 207: The H-PCRF 104 transmits an Acknowledge IP CAN Session Establishment to the PCEF 107.

Step 207 is augmented with the PCRF 104 possibility to instruct the PCEF 107 to set up a separate bearer whenever a PCC rule has MBR>GBR. This may be elaborated to indicate the maximum number of such separate bearers, to prevent that the total number of bearers grows too large. This may be indicated using an indicator, flag, information element, parameter, certain values, range of values etc. In the following, the term indicator will be used for the sake of simplicity.

For the Gateway Control Session Establishment in case of PMIP, the PCRF 104 provides the same kind of indicator to the BBERF 115, since the BBERF 115 has the task to establish bearers that the PCEF 107 has in the case of GTP all the way to the PCEF 107. The signaling to the BBERF 115 is not illustrated in FIG. 2.

There are multiple procedures to modify an IP-CAN session. The embodiments herein provide the PCRF 104 with the per PCC rule decision power as to whether a separate bearer is required or not for a rule with MBR>GBR.

The PCC rule data is augmented with the indicator that the PCC rule shall be allocated to, i.e. have the bearer binding with, a separate bearer.

Guidelines for PCRF configuration will now be discussed. The PCRF 104 preferably keeps track of the level of support for Explicit Congestion Notification (ECN). The support from the access network is typically a matter of local configuration at the PCRF 104, while per PCC rule support is typically derived from Session Description Protocol (SDP) data received over Rx from an AF 110.

If the full support for ECN is at hand, i.e. access network and from the endpoints, there is no need to set the indicator for PCC rules where MBR>GBR.

For the best performance, the PCRF 104 should prevent that MBR>GBR flows without ECN support compete with flows that enjoy ECN support on the same bearer.

On the same bearer, there should be either: (a) MBR=GBR flows and/or flows with full ECN support only; or (b) MBR>GBR flows without full ECN support.

For the case (b) there is a risk for unfairness between flows on the same bearer. The PCRF 104 may prevent that by providing the indicator in the PCC rule that the flow shall be allocated to a separate bearer.

So, for flows with MBR>GBR and without full support for ECN the PCRF 104 may mitigate unfairness between flows by providing the per PCC rule indicator that a separate bearer is required.

Step 208: The PCEF 107 transmits a Credit Request to the OCS 120.

Step 209: The OCS 120 transmits a Credit Response to the PCEF 107.

Step 210: The PCEF 107 transmits an Establish IP-CAN Bearer Response.

Step 211: IP CAN Bearer Signaling is transmitted.

Step 212: The PCEF 107 transmits an IP CAN Session Establishment Acknowledge to the H-PCRF 104.

Figure 3:
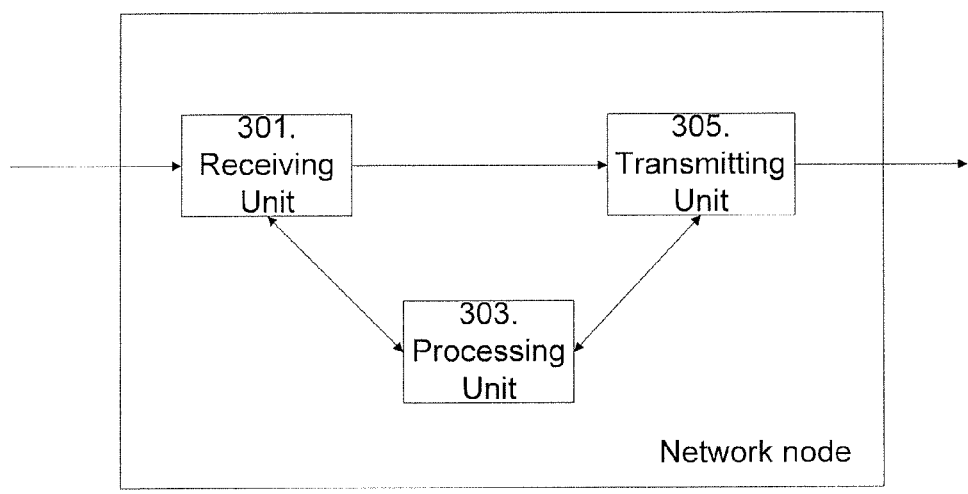
FIG. 3 is a block diagram illustrating embodiments of a network node.

To perform the method steps shown in FIG. 2 for enabling multiple bearer support in a communication network 100, a network node, such as e.g. the PCRF 104, comprises an arrangement as shown in FIG. 3. The network node comprises a receiving unit 301 configured to receive a message from a gateway, such as a PCEF 107 or BBERF 115. The message may be an indication of IP-CAN session establishment. The network node further comprises a processing unit 303 configured to obtain the max number of separate bearers, to prevent that the total number of bearers grows too large. This may be in the form of an indicator, flag, parameter, information element etc. that the PCC rule shall be allocated to, i.e. have the bearer binding with, a separate bearer. The indicator may be dynamically obtained or derived internally in the network node or externally from another network node in the communication network 300. In some embodiments, the indicator may be preconfigured, e.g. by the operator.

Further, the processing unit 303 evaluates or checks the MBR in relation to GBR, e.g. if MBR<GBR, MBR=GBR or if MBR>GBR. Depending on the outcome of the evaluation:

The processing unit 303 takes a decision whether a separate bearer is required or not. The processing unit 303 takes the decision depending on the network capability to support ECN, and the user subscription.

The processing unit 303 further provides the indicator in the PCC rule.

The network node further comprises a transmitting unit 305 configured to transmit instructions to the gateway 113. The instructions may comprise the indicator, which instructs the gateway 113 to bind PCC/QoS Rules into separate bearers when the MBR is greater than the GBR and no ECN support is provided.

It should be noted that the bearer binding function unit, e.g. the PCEF or BBERF is also a network node for which FIG. 3 may be used to illustrate functional blocks such as receiving and transmitting units and processing unit.

The present mechanism for enabling multiple bearer support in a communication network 100 may be implemented through one or more processors, such as the processor 303 in the network node depicted in FIG. 3, together with computer program code for performing the functions of the embodiments herein. The processor may be for example a Digital Signal Processor (DSP), Application Specific Integrated Circuit (ASIC) processor, Field-programmable gate array (FPGA) processor or micro processor. The program code mentioned above may also be provided as a computer program product, for instance in the form of a data carrier carrying computer program code for performing the embodiments herein when being loaded into network node. One such carrier may be in the form of a CD ROM disc. It is however feasible with other data carriers such as a memory stick. The computer program code may furthermore be provided as pure program code on a server and downloaded to the network node remotely.

Summarized, the embodiments herein enables the PCC architecture so that it may determine whether separate bearers need to be established for service(s) that demand MBR>GBR when no ECN support is provided.

The PCRF instructs the PCEF to bind PCC/QoS Rules into separate bearers when MBR is greater than GBR, by comprising an indicator over Gx/Gxx reference point. Typically the PCRF takes the decision depending on the network capability to support ECN, and the user subscription.

An example of usage is an operator that wants gold subscribers to get separate bearers then get better user experience and bronze subscribers to get the same bearer when user experience is not that relevant.

A second example is an operator that wants to transfer voice over a separate bearer when MBR is greater than GBR to guarantee good quality for all type of subscribers.

For those deployments with an access node implementing a BBERF, the PCRF instructs the BBERF as well.

Depending on operator policies configured in the PCRF, it is possible to decide whether a separate bearer is required for a service data flow when the MBR is greater than the GBR. These operator policies will be based on information stored in the PCRF, e.g. kind of subscriber, and the final decision will be notified to the PCEF via the Gx reference point.

When the operator policies relate to all IP-CAN sessions and users, they may be configured locally in the PCEF. Any decision provided by the PCRF would overwrite the decision made locally.

The embodiments herein are not limited to the above described preferred embodiments. Various alternatives, modifications and equivalents may be used. Therefore, the above embodiments should not be taken as limiting the scope.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The invention claimed is:

1. An infrastructure node for handling bearer establishment in a telecommunications network comprising
a processing unit;
a receiving unit; and
a transmitting unit;
wherein the processing unit is arranged to:
receive, using the receiving unit, an indication of session establishment for a bearer from a bearer binding function unit,
obtain profile information with Quality of Service, QoS, information about maximum bit rate, MBR, and guaranteed bit rate, GBR, related to the bearer,
determine that the MBR is larger than the GBR,
make a policy decision, and
transmit, using the transmitting unit, an acknowledgement of session establishment to the bearer binding function unit with an indicator that a separate bearer is to be established.

2. The infrastructure node according to claim 1, wherein the indication for a separate bearer also comprise an indication of maximum number of separate bearers.

3. The infrastructure node according to claim 1, wherein the processing unit is further arranged to determine if there is explicit congestion notification, ECN, support related to the bearer establishment.

4. The infrastructure node according to claim 3, wherein the policy decision is made based on network capability to support ECN and user subscription data.

5. The infrastructure node according claim 1, wherein the bearer binding function unit is one of a policy and charging enforcement function, PCEF, or a bearer binding and event reporting function, BBERF.

6. The infrastructure node according to claim 1, wherein the acknowledgement of session establishment comprises policy and charging control, PCC, rule data.

7. The infrastructure node according claim 1, wherein the node is a policy and charging rules function, PCRF, node.

8. The infrastructure node according to claim 1, wherein the indication for separate bearer is transmitted over one of a Gx or Gxx reference point.

9. A method in an infrastructure node in a telecommunications network for handling bearer establishment, the method comprising steps of:
receiving, using a receiving unit, an indication of session establishment for a bearer from a bearer binding function unit;
obtaining profile information with Quality of Service, QoS, information about maximum bit rate, MBR, and guaranteed bit rate, GBR, related to the bearer;
determining that the MBR is larger than the GBR;
making a policy decision; and
transmitting, using the transmitting unit, an acknowledgement of session establishment to the bearer binding function unit with an indicator that a separate bearer is to be established.

10. The method according to claim 9, further comprising a step of determining if there is explicit congestion notification, ECN, support related to the bearer establishment.

11. The method according to claim 9, wherein the acknowledgement of session establishment further comprise an indicator indicating a maximum number of separate bearers to establish.

* * * * *